US 8,793,360 B1
Jul. 29, 2014

(12) United States Patent
Belgard et al.

(54) SYSTEMS AND METHODS FOR TESTING DENIAL OF SERVICE ATTACKS (75) Inventors: Scott Andrew Belgard, Randolph, MA (US); Edward James Norris, Lancaster, MA (US); David Kenneth Dumas, Littleton, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1275 days.

(21) Appl. No.: 10/444,267

(22) Filed: May 23, 2003

(51) Int. Cl.
G06F 15/173 (2006.01)

(52) U.S. Cl.
USPC ............ 709/224; 709/229; 713/187; 713/188

(58) Field of Classification Search
USPC .......... 709/223–225, 229, 231–232; 380/255; 713/150–155, 160, 182, 187–193
See application file for complete search history.

(56) References Cited

U.S. PATENT DOCUMENTS

| | | | | |
|---|---|---|---|---|
| 6,185,689 B1 * | 2/2001 | Todd et al. | ...................... | 726/25 |
| 6,513,122 B1 * | 1/2003 | Magdych et al. | ............... | 726/23 |
| 6,851,062 B2 * | 2/2005 | Hartmann et al. | .............. | 726/22 |
| 6,920,493 B1 * | 7/2005 | Schwab | ........................ | 709/223 |
| 6,952,779 B1 * | 10/2005 | Cohen et al. | ...................... | 726/22 |
| 7,028,179 B2 * | 4/2006 | Anderson et al. | ............. | 713/154 |
| 7,043,756 B2 * | 5/2006 | Tsafnat et al. | .................. | 726/23 |
| 7,743,134 B2 * | 6/2010 | Kohler et al. | .................. | 709/224 |
| 2003/0041264 A1 * | 2/2003 | Black et al. | .................... | 713/201 |

* cited by examiner

Primary Examiner — Mohamed Ibrahim (57) ABSTRACT

A system (130) for monitoring a denial of service attack upon a target network resource includes a memory (210) and a processor (205). The memory (210) stores instructions. The processor (205) executes the instructions in the memory (210) to receive one of a plurality of denial of service attack profiles, each profile identifying the target network resource and to execute a denial of service attack against the target network resource in accordance with the received profile. The processor (205) further executes the instructions in the memory (210) to scan one or more ports of the target network resource to determine an effect of the executed denial of service attack.

30 Claims, 9 Drawing Sheets

| TABLE ENTRIES 405 | ATTACK SCENARIO LABEL 410 | SOURCE ADDRESS 415 | SOURCE PORT 420 | DEST. ADDRESS 425 | DEST. PORT 430 | ATTACK DURATION 435 | PKT. DELAY 440 | TCP FLAG 445 | CHG FLAGS 450 | ICMP FLAG 455 | PYLD SIZE 460 | UDP FLAG 465 | PYLD SIZE 470 | BGP FLAG 475 | RIP FLAG 480 | NETS 485 |
|---|---|---|---|---|---|---|---|---|---|---|---|---|---|---|---|---|
| → | ATTACK_SCENARIO_1 | SADDRESS_1 | SPRT_1 | DADDRESS_1 | DPRT_1 | X sec | 10000 ms | ✓ | m % | ✓ | 32 | | | ✓ | | |
| → | | | --- | | --- | | --- | | --- | | --- | ✓ | --- | | --- | |
| → | ATTACK_SCENARIO_N | SADDRESS_N | SPRT_N | DADDRESS_N | DPRT_N | Y sec | 15000 ms | ✓ | n % | ✓ | 35 | | 123 | | ✓ | 1 |

SYSTEMS AND METHODS FOR TESTING DENIAL OF SERVICE ATTACKS

FIELD OF THE INVENTION

The present invention relates generally to communication networks and network devices and, more particularly, to systems and methods for executing and testing denial of service attacks upon communication networks and/or network devices.

BACKGROUND OF THE INVENTION

With the advent of the large scale interconnection of computers and networks, information security has become critical for many organizations. Both active and passive attacks on the security of a computer or network have been developed by "hackers" to obtain sensitive or confidential information, or to inhibit the use or operation of network resources. Active attacks involve some modification of the data stream, or the creation of a false data stream. One active attack that has been successfully employed by "hackers" is the denial of service (DoS) attack. A denial of service attack prevents or inhibits the normal use or management of communications facilities, such as disruption of a server or an entire network, by overloading it with messages so as to degrade its performance.

One conventional DoS attack involves Transmission Control Protocol (TCP) SYN packet flooding. The protocol for TCP connection requests requires that a server complete a three way hand-shaking process with the client when a SYN packet is received. When the SYN packet is received, the server returns an acknowledgement to the originating client to grant the connection request. The server waits for the client to acknowledge the server's reply to the SYN connection request. The time waiting for the client's acknowledgement ties up resources and, if the server is flooded with multiple SYN connection requests, connection requests from authentic clients are denied because the server's resources are exhausted handling the flooded SYN connection requests. Other conventional DoS attacks use similar "flooding" techniques for overwhelming network or network device resources.

Ongoing research has been directed towards developing techniques for defending against DoS attacks. To develop such defensive techniques, however, an understanding of the scenarios that cause a denial of service at a network or network device would be helpful. With an understanding of the causes of any particular denial of service at a network or network device, defensive techniques can more readily be developed and implemented.

Therefore, there exists a need for systems and methods that can selectively apply DoS attacks on networks or network devices, and which can monitor such attacks and accumulate data that can be used to determine which attacks actually cause a denial of service. Such data can be analyzed to determine the most effective DoS attacks against any particular network resource so that defensive countermeasures can be implemented.

SUMMARY OF THE INVENTION

Systems and methods consistent with the present invention address this need, and others, by implementing customized DoS attacks upon a network resource while simultaneously monitoring the success of those attacks. Consistent with the present invention, any one of several attacks (e.g., User Datagram Protocol (UDP) packet flooding, TCP SYN packet flooding, Internet Control Message Protocol (ICMP) echo packet flooding, Routing Information Protocol (RIP) packet flooding, and/or Border Gateway Protocol (BGP) packet flooding) may be selected for executing DoS attacks upon a target network resource. After execution of the selected attacks, systems and methods consistent with the invention may permit the monitoring of the success of the DoS attacks at the target network resource. To monitor the DoS attacks, test probe connection requests may be sent to different port types of the target network resource. Based on whether the connection requests are refused, systems and methods consistent with the invention may indicate the status of the port types of the target network device and may collect various data regarding the success of the DoS attacks. The collected data may be used to determine the most effective DoS attacks upon a target network resource so that defensive countermeasures can be implemented and tested.

In accordance with the purpose of the invention as embodied and broadly described herein, a method of monitoring a denial of service attack upon a target network resource includes selecting one of multiple denial of service attack profiles, each profile identifying the target network resource. The method further includes executing a denial of service attack against the target network resource in accordance with the selected profile and monitoring one or more ports of the target network resource to determine an effect of the executed denial of service attack.

In another implementation consistent with the present invention, a data structure encoded on a non-transitory computer readable medium includes first data identifying a network address of a network resource to be attacked by denial of service attacks. The data structure further includes second data indicating a set of denial of service attacks to be used for attacking the network resource, the set comprising transmission control protocol (TCP) packet flooding, Internet control message protocol (ICMP) echo packet flooding, user datagram protocol (UDP) packet flooding, routing information protocol (RIP) packet flooding, and border gateway protocol (BGP) packet flooding. The data structure also includes third data indicating a duration for the denial of service attacks and fourth data indicating a delay time between packets of the denial of service attacks.

In a further implementation consistent with the present invention, a graphical user interface for specifying parameters of a denial of service attack upon a network resource that is to be a target of the denial of service attack, the graphical user interface manipulating data entry groups that perform actions on a database, includes a first activation area on the graphical user interface for activating creation of a first data entry group, a first graphical area associated with the first data entry group requesting a network address of the network resource, the first data entry group accepting the requested network address upon activation. The graphical user interface further includes a second activation area on the graphical user interface for activating creation of a second data entry group, a second graphical area associated with the second data entry group proffering a plurality of denial of services attacks and requesting a selection of attacks from the plurality of attacks, the second data entry group accepting the selection of attacks from the plurality of attacks upon activation.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and their equivalents.

Systems and methods, consistent with the present invention, enable the customization, and simultaneous monitoring, of DoS attacks upon a network resource. Consistent with the present invention, any one of several attacks, including UDP packet flooding, TCP SYN packet flooding, ICMP echo packet flooding, RIP packet flooding, and/or BGP packet flooding, may be selected for executing a customized DoS attack upon a target network resource. Test probe connection requests may be sent to different port types of the target network resource to monitor the results of the DoS attack upon the network resource. Based on whether the connection requests are refused, systems and methods consistent with the invention may indicate the status of the port types of the target network resource and may indicate the success of the DoS attacks.

Exemplary Network

Figure 1:
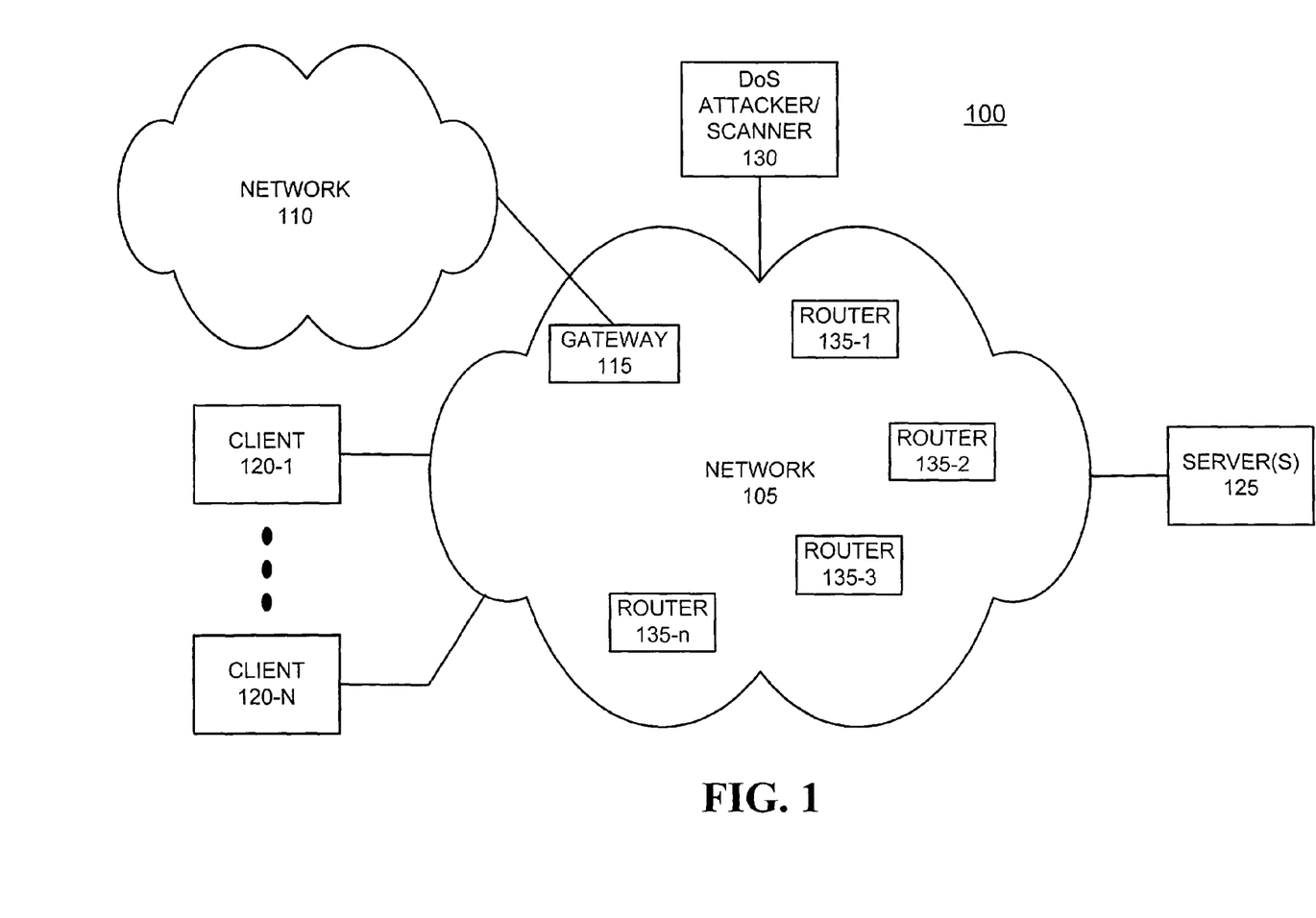
FIG. 1 illustrates an exemplary network in which systems and methods, consistent with the present invention, may be implemented.

FIG. 1 illustrates an exemplary network 100 in which systems and methods, consistent with the present invention, may implement and monitor denial of service attacks upon resources of network 100. Network 100 may include a sub-network 105 interconnected with a sub-network 110 via a gateway 115. Sub-networks 105 and 110 can include one or more networks of any type, including a local area network (LAN), metropolitan area network (MAN), wide area network (WAN), Internet, or Intranet. Sub-network 105 may include multiple routers 135-1 through 135-n for routing data through sub-network 105. Gateway 115 may route data between sub-network 105 and sub-network 110.

Network 100 may include one or more clients 120-1 through 120-N, a server(s) 125, and a DoS attacker/scanner 130. Clients 120, server(s) 125 and DoS attacker/scanner 130 may connect with sub-network 105 via wired, wireless or optical connection links (not shown). Each client 120 may include a network device (e.g., a host) that requests services from server(s) 125. Each server 125 may include a network device that provides services to clients 120 responsive to the requests. DoS attacker/scanner 130 may implement customized DoS attacks upon one or more target network resources, such as, for example, clients 120, server(s) 125, routers 135, and/or gateway 115. DoS attacker/scanner 130 may further monitor the customized DoS attacks upon the target network resources to detect the success of the DoS attacks.

It will be appreciated that the number of components illustrated in FIG. 1 is provided for explanatory purposes only. A typical network may include more or fewer components than are illustrated in FIG. 1.

Exemplary Denial of Service Attacker/Scanner

Figure 2:
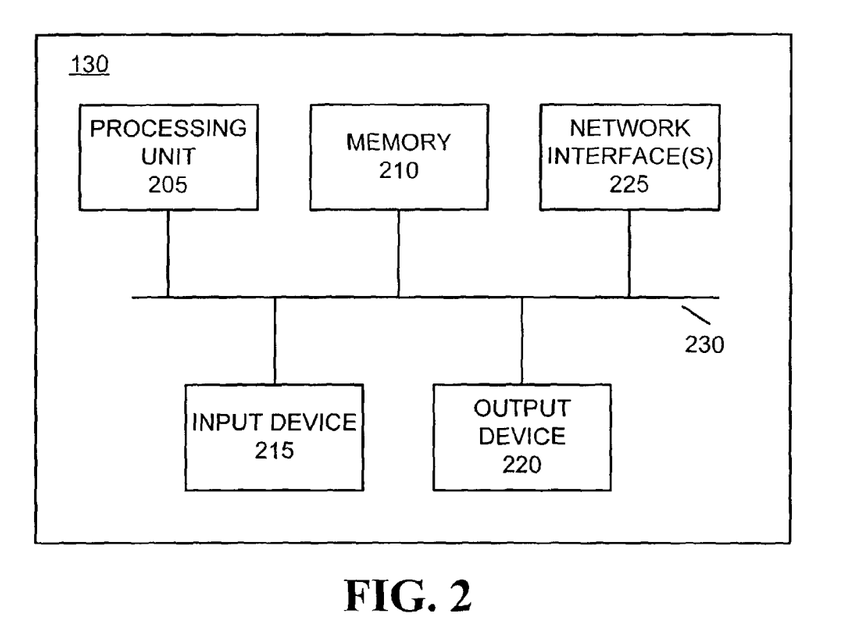
FIG. 2 illustrates an exemplary configuration of the DOS attacker/scanner of FIG. 1 consistent with the present invention.

FIG. 2 illustrates exemplary components of DoS attacker/scanner 130 consistent with the present invention. DoS attacker/scanner 130 may include a processing unit 205, a memory 210, an input device 215, an output device 220, network interface(s) 225 and a bus 230.

Processing unit 205 may perform all data processing functions for inputting, outputting, and processing of data. Memory 210 may include Random Access Memory (RAM) that provides temporary working storage of data and instructions for use by processing unit 205 in performing processing functions. Memory 210 may additionally include Read Only Memory (ROM) that provides permanent or semi-permanent storage of data and instructions for use by processing unit 205. Memory 210 can also include large-capacity storage devices, such as a magnetic and/or optical recording medium and its corresponding drive.

Input device 215 permits entry of data into DoS attacker/scanner 130 and may include a user interface (not shown). Output device 620 permits the output of data in video, audio, and/or hard copy format. Network interface(s) 225 interconnect DoS attacker/scanner 130 with sub-network 105. Bus 230 interconnects the various components of DoS attacker/scanner 130 to permit the components to communicate with one another.

Exemplary Denial of Service Attack Scenario Database

Figure 3:
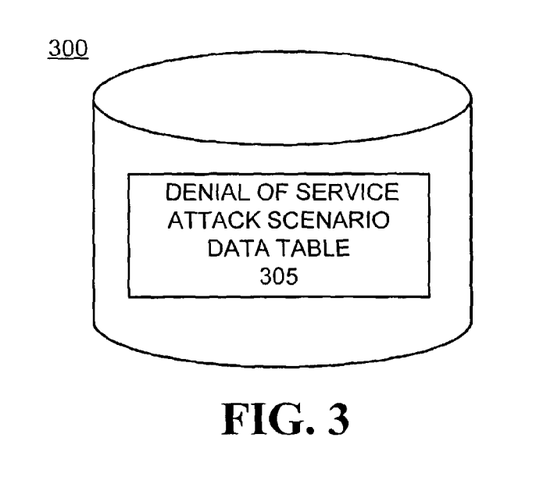
FIG. 3 illustrates an exemplary database consistent with the present invention.

FIG. 3 illustrates an exemplary DoS attacker scenario database 300 that may be associated with DoS attacker/scanner 130. Database 300 may be stored in, for example, memory 210 or may be located external to DoS attacker/scanner 130. Database 300 may include a DoS attack scenario data table 305 that further contains the data specifying the parameters of DoS attacks.

Figure 4:
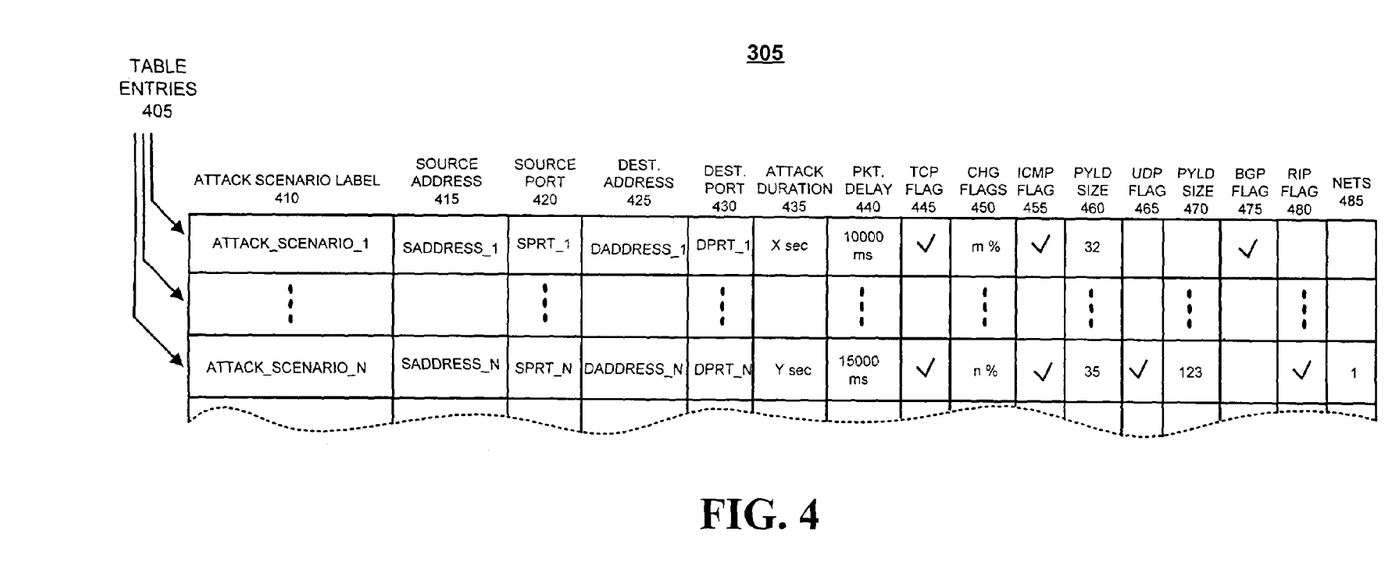
FIG. 4 illustrates an exemplary DoS attack scenario table consistent with the present invention.

FIG. 4 illustrates an exemplary DoS attack scenario data table 305 consistent with the present invention. DoS attack scenario data table 305 may include multiple table entries 405, each of which may include the following exemplary fields: an attack scenario label 410, a source address 415, a source port 420, a destination address 425, a destination port 430, an attack duration 435, a packet delay value 440, a TCP flag 445, a change flags value 450, an ICMP echo flag 455, a payload size 460, a UDP flag 465, a payload size 470, a BGP flag 475, a RIP flag 480, and a nets value 485.

Attack scenario label 410 may identify the scenario specified by the parameters included in the corresponding table entry 405. Source address 415 may indicate a network address, such as, for example, an Internet Protocol (IP)

address that is to be placed in outgoing DoS attack packets. Source address 415 may indicate a false or counterfeit network address for purpose of hiding the identity of the source of the DoS attacks. Source port 420 may indicate a port number that is to be placed in outgoing DoS attack packets.

Destination address 425 may indicate a known network address of the target network resource upon which DoS attacks are to be executed. Destination address 425 may include, for example, an IP address. Destination port 430 may indicate a known port of the target network resource associated with destination address 425 upon which the DoS attacks are to be executed. Attack duration 435 may indicate a duration of the DoS attacks. In one implementation, the duration may be expressed in seconds. Packet delay value 440 may indicate a delay between the transmission of each of the packets of the DoS attacks. In one implementation, the packet delay may be expressed in milliseconds (ms).

TCP flag 445 may indicate selection of a TCP SYN packet flooding type of DoS attack. Change flags value 450 may indicate the percentage of TCP packets of a DoS attack in which flags of the packets are varied. ICMP echo flag 455 may indicate selection of an ICMP echo packet flooding type of DoS attack. Payload size 460 may indicate a data size of the payload of the packets of the ICMP echo packet flooding DoS attack. UDP flag 465 may indicate selection of a UDP packet flooding type of DoS attack. Payload size 470 may indicate a data size of the payload of the packets of the UDP packet flooding DoS attack. BGP flag 475 may indicate selection of a BGP packet flooding type of attack. RIP flag 480 may indicate selection of a RIP packet flooding type of attack. Nets value 485 may indicate a number of networks involved in the routing of packets from the DoS attacker/scanner 130 to the target network resource.

Exemplary Denial of Service Attack Scenario Creation Process

Figure 5:
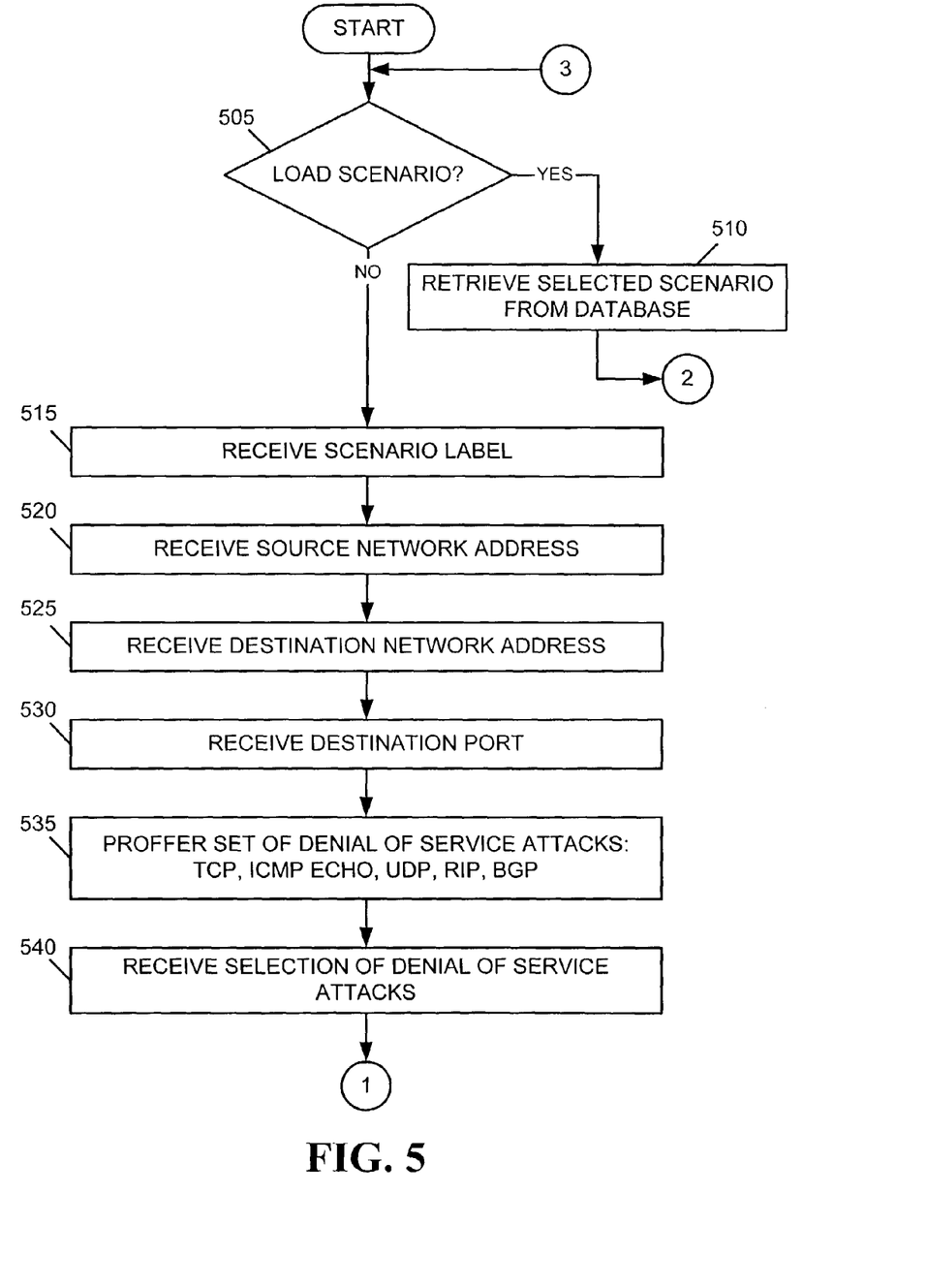
FIGS. 5-6 are flow charts that illustrate an exemplary DoS attack scenario creation process consistent with the present invention.
Figure 6:
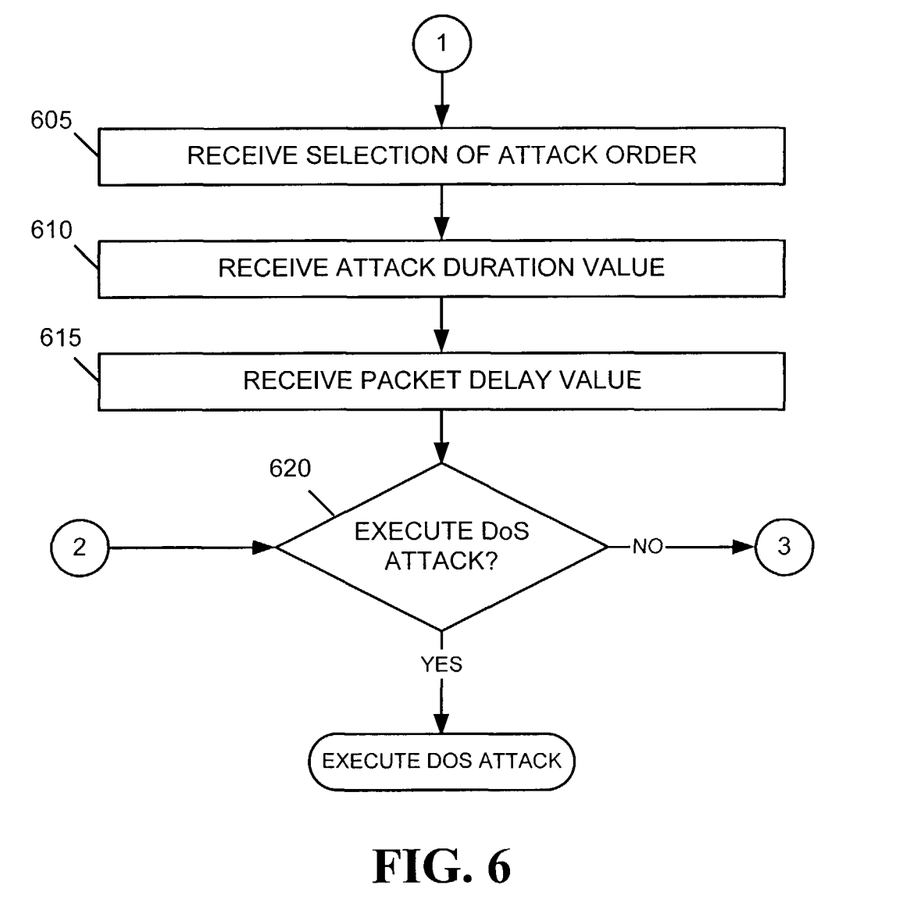
Figure 7:
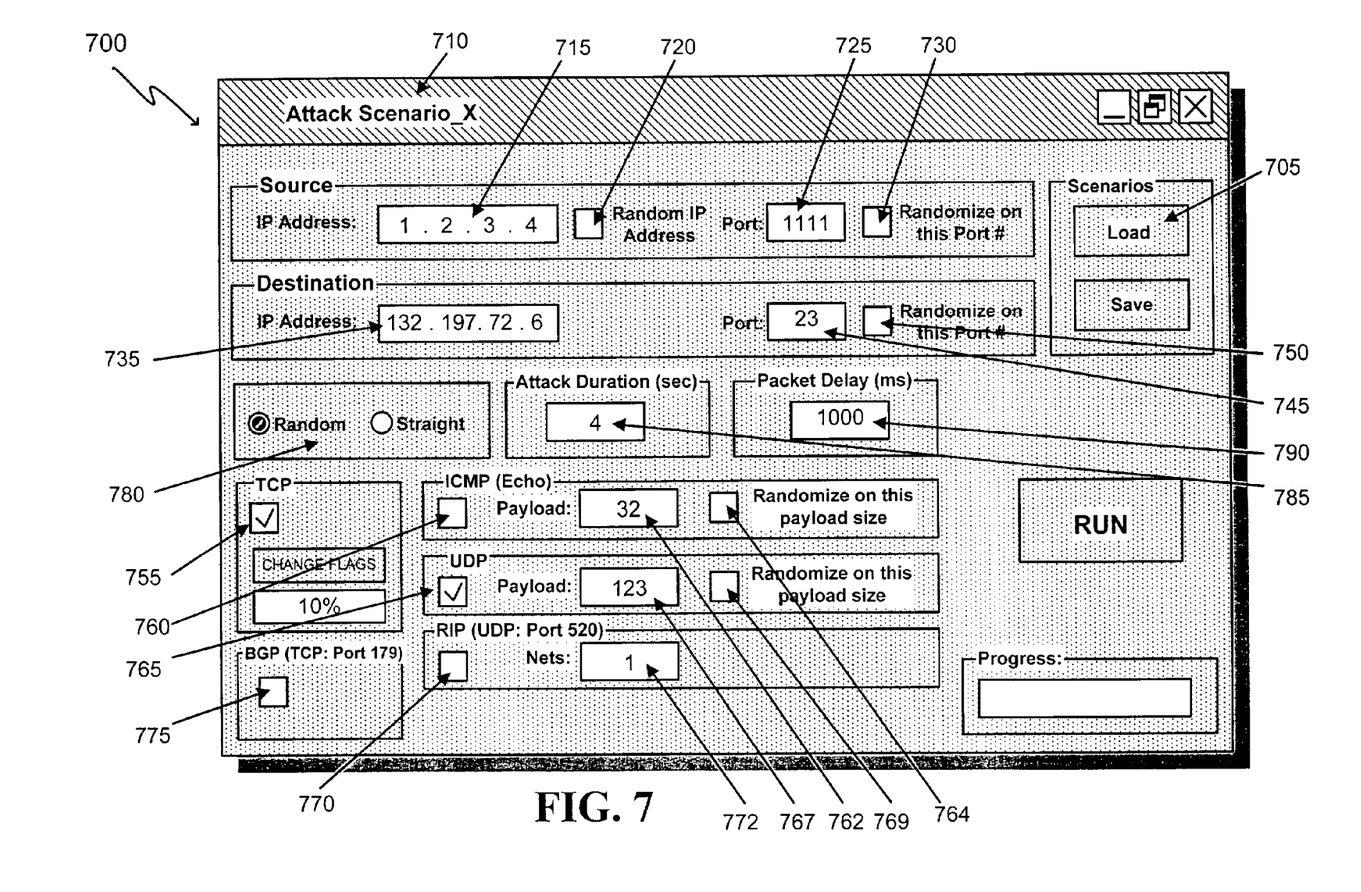
FIG. 7 illustrates an exemplary DoS attack scenario creation window of a graphical user interface consistent with the present invention.

FIGS. 5-6 are flow charts that illustrate an exemplary process, consistent with the present invention, for loading and/or creating one or more DoS attack scenarios. As one skilled in the art will appreciate, the method exemplified by FIGS. 5-6 can be implemented as a sequence of instructions and stored in memory 210 of DoS attacker/scanner 130 for execution by processing unit 205. FIG. 7 will be referenced as a "window" 700 of an exemplary graphical user interface in conjunction with the exemplary process of FIGS. 5-6. One skilled in the art will recognize, however, that other mechanisms for receiving and entering attack scenario data may be used consistent with the present invention.

The exemplary DoS attack scenario creation process may begin with a determination of whether a previously created attack scenario is to be loaded from, for example, data table 305 [act 505](FIG. 5). As shown in FIG. 7, the loading of a previously stored scenario may be indicated by selection of the "Load" button 705. If a previously created attack scenario is to be loaded, a selected scenario may be retrieved from data table 305 [act 510]. If not, new DoS scenario attack creation may begin with receipt of a new scenario label via, for example, input device 215 [act 515]. The received scenario label may be stored as attack scenario label 410 in data table 305. FIG. 7 illustrates an exemplary "window" 700 of a graphical user interface that permits the specification of the parameters of the scenario indicated by scenario label 710.

A source network address may further be received via, for example, input device 215 [act 520]. The received source network address may be stored as source address 415 in data table 305. FIG. 7 illustrates a source address field 715 into which an appropriate network address may be entered via input device 215. Optionally, entering of the source network address may include selection of random IP address box 720. If box 720 is selected (e.g., checked), then the address in source address field 715 may be randomized with the sending of each attack packet during the DoS attack duration. Entering of a source network address in source address field 715 may also include entering a source port number in port field 725. Entering of the source port number may include selection of the "randomize on this port #" box 730. If box 730 is selected then the source port number in port field 725 may be randomized with the sending of each attack packet during the DoS attack duration. The entered source port number may be stored as source port 420 in data table 305.

A destination network address may further be received via, for example, input device 215 [act 525]. The received destination network address may be stored as destination address 425 in data table 305. FIG. 7 illustrates a destination address field 735 into which an appropriate destination network address may be entered via input device 215. A destination port number may further be received via input device 215 [act 530]. The received destination port number may be stored as destination port 430 in data table 305. FIG. 7 illustrates a port field 745 into which the destination port number may be entered. Entering of the destination port number may include selection of the "randomize on this port #" box 750. If box 750 is selected, then the source port number in port field 745 may be randomized with the sending of each attack packet during the DoS attack duration.

A set of denial of service attacks may be proffered, via, for example, output device 220 [act 535]. As is illustrated in FIG. 7, output device 220 may include a graphical user interface, such as, for example window 700. Window 700 may display a set of multiple DoS attacks, such as TCP packet flooding, ICMP packet flooding, UDP packet flooding, RIP packet flooding and BGP packet flooding. A selection of the DoS attacks from the proffered set of DoS attacks may be received via, for example, input device 215 [act 540]. As illustrated in FIG. 7, the DoS attacks can be selected by, for example, "checking" the appropriate box corresponding to the attack(s) desired. This may include selecting the TCP packet flooding box 755, ICMP echo packet flooding box 760, UDP packet flooding box 765, RIP packet flooding box 770 and/or BGP packet flooding box 775. In addition to checking ICMP echo packet flooding box 760, a payload value may be entered in payload field 762. Additionally, a "randomize on this payload size" box 764 may be checked to randomize the payload size of each ICMP packet of the DoS attack. For each DoS attack selected, an appropriate flag can be set in TCP flag 445, ICMP flag 455, UDP flag 465, BGP flag 475 or RIP flag 480 of data table 305. In addition to checking UDP packet flooding box 765, a payload value may be entered in payload field 767. Furthermore, a "randomize on this payload size" box 769 may be checked to randomize the payload size of each UDP packet of the DoS attack. In addition to checking RIP packet flooding box 770, a "nets" value may be entered nets field 772. The "nets" value indicate a number of networks involved in the routing of packets from DoS attacker/scanner 130 to the target network resource. The "nets" value entered in nets field 772 may be stored in nets field 485 of data table 305.

A selection of an order of the packets in the DoS attack may then be received via, for example, input device 215 [act 605] (FIG. 6). FIG. 7 illustrates a panel 780 of window 700 in which either a "Random" or "Straight" packet order can be selected. Selection of a "straight" packet order will order the packets of the different DoS attacks such that they are transmitted sequentially. For example, if TCP packet flooding box 755, ICMP echo packet flooding box 760 and UDP packet flooding box 765 are selected, then a "straight" packet order will sequentially transmit packets of each of the flooding attacks (e.g., TCP, ICMP, UDP, TCP, ICMP, UDP, etc.). Selection of a "random" order will randomize the sequence of the packets of the different DoS attacks.

An attack duration value may be received via, for example, input device 215 [act 610]. The received attack duration may be stored as attack duration 435 of data table 305. FIG. 7 illustrates an attack duration field 785 into which an attack duration interval may be entered. The attack duration value indicates a total duration over which all the selected attacks occur. A packet delay value may further be received via, for example, input device 215 [act 615]. The received packet delay value 440 may be stored as packet delay 440 of data table 305. FIG. 7 illustrates a packet delay field 790 into which a packet delay value may be entered.

A determination may be made whether the recently created DoS attack scenario, or a previously loaded attack scenario, should be executed [act 620]. If not, the exemplary process may return to act 505 above. If a DoS attack scenario is to be executed, then the exemplary DoS attack scenario execution process described with respect to FIG. 8 below may be implemented.

Exemplary Denial of Service Attack Execution Process

Figure 8:
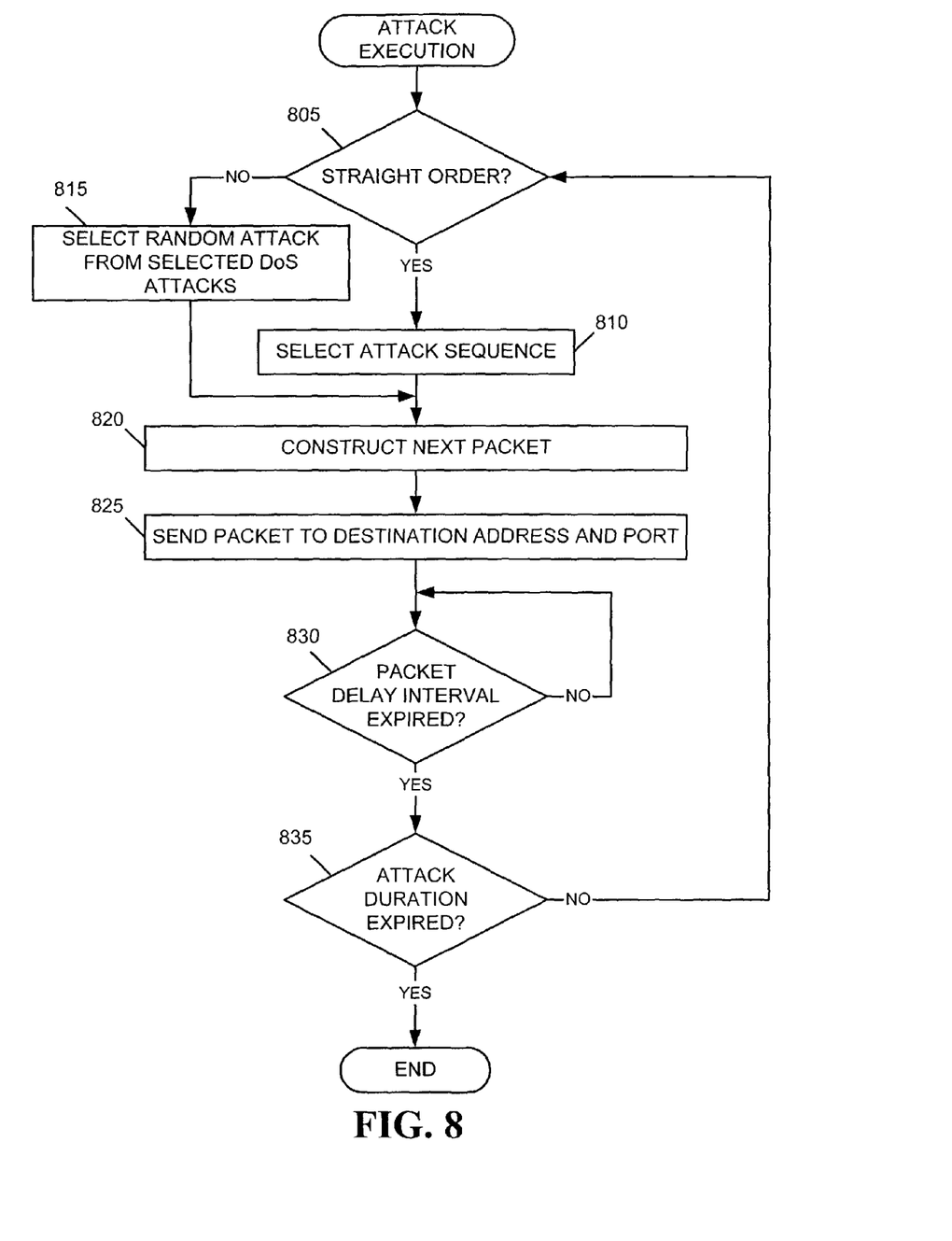
FIG. 8 is a flow chart that illustrates an exemplary DoS attack execution process consistent with the present invention.

FIG. 8 is a flow chart that illustrates an exemplary process, consistent with the present invention, for constructing DoS attack packets and sending the packets to their destination. As one skilled in the art will appreciate, the method exemplified by FIG. 8 can be implemented as a sequence of instructions and stored in memory 210 of DoS attacker/scanner 130 for execution by processing unit 205.

The exemplary DoS attack execution process may begin with a determination of whether a "straight" attack order has been selected [act 805]. Selection of a "straight" packet order will order the packets of the different DoS attacks such that they are transmitted sequentially. If a "straight" order is selected, then an appropriate attack sequence may be selected [act 810]. For example, if TCP packet flooding, ICMP echo packet flooding; and UDP packet flooding have been selected, then a "straight" packet order will sequentially transmit packets of each of the flooding attacks (e.g., TCP, ICMP, UDP, TCP, ICMP, UDP, etc.). If a "random" order is selected, then a random attack from the selected DoS attacks may be selected [act 815]. For example, if TCP packet flooding, ICMP echo packet flooding, and UDP packet flooding have been selected, then one of the three may be randomly selected as the next packet to be transmitted. The next DoS attack packet determined in accordance with acts 810 and 815 above may then be constructed [act 820]. The packet may be constructed with the source and destination address values (e.g., fields 415 and 425) and source and destination port numbers (e.g., fields 420 and 430) retrieved from data table 305. In the case of an ICMP echo packet or a UDP packet, the packet may be constructed with a payload specified by payload size field 460 or payload size field 470, respectively. The constructed packet may then be sent to the destination address and port of the target network device [act 825].

A determination may be made whether the packet delay interval, specified in field 440 of the appropriate table entry 405 of data table 305, has expired [act 830]. If so, a further determination may be made whether an attack duration, specified in field 435 of the appropriate table entry 405 of data table 305, has expired [act 835]. If not, a subsequent attack packet may be selected and constructed beginning at act 805 above. If the attack duration has expired, then the DoS attack execution process may complete.

Exemplary Denial of Service Attack Monitoring Process

Figure 9:
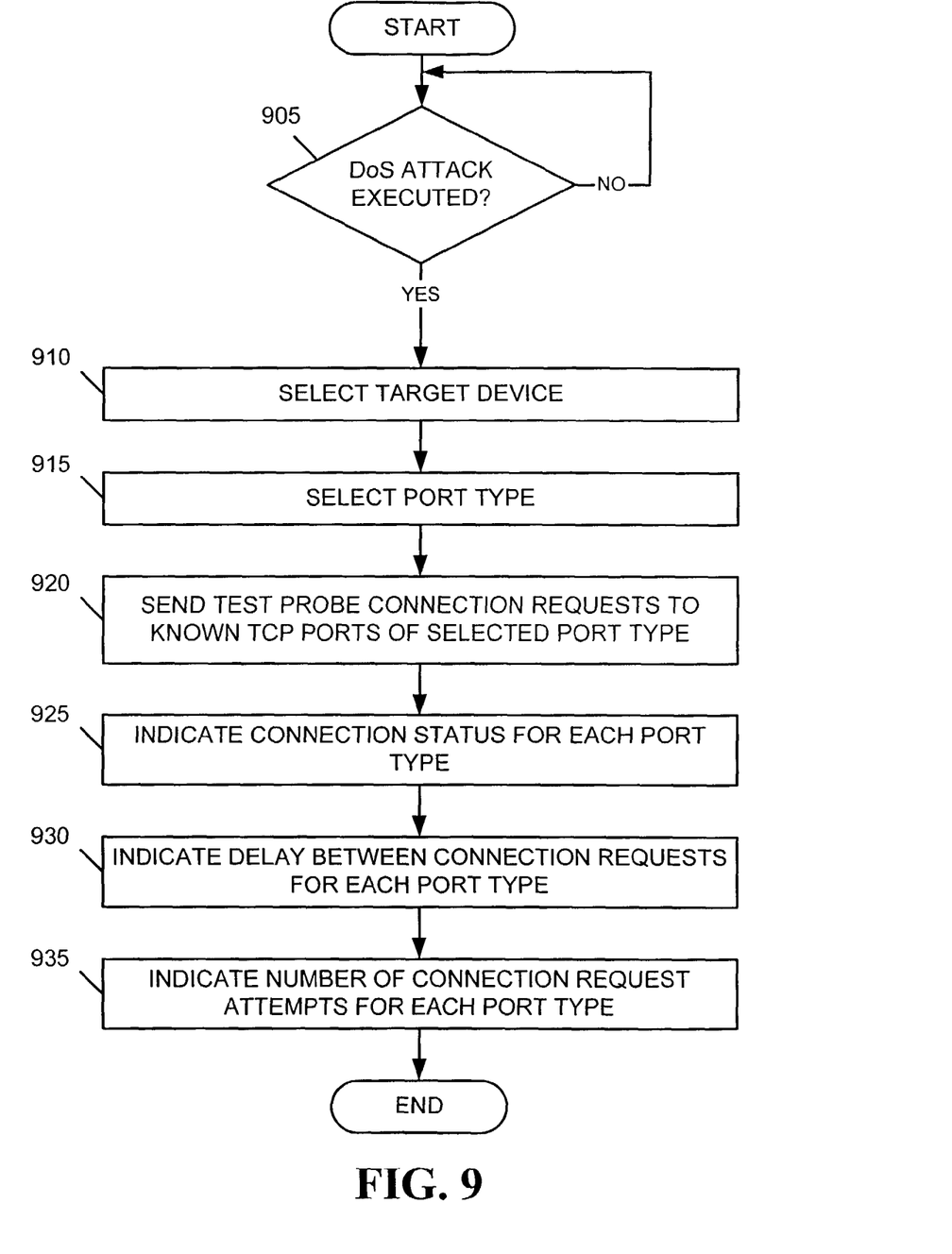
FIG. 9 is a flow chart that illustrates an exemplary DoS attack monitoring process consistent with the present invention.
Figure 10:
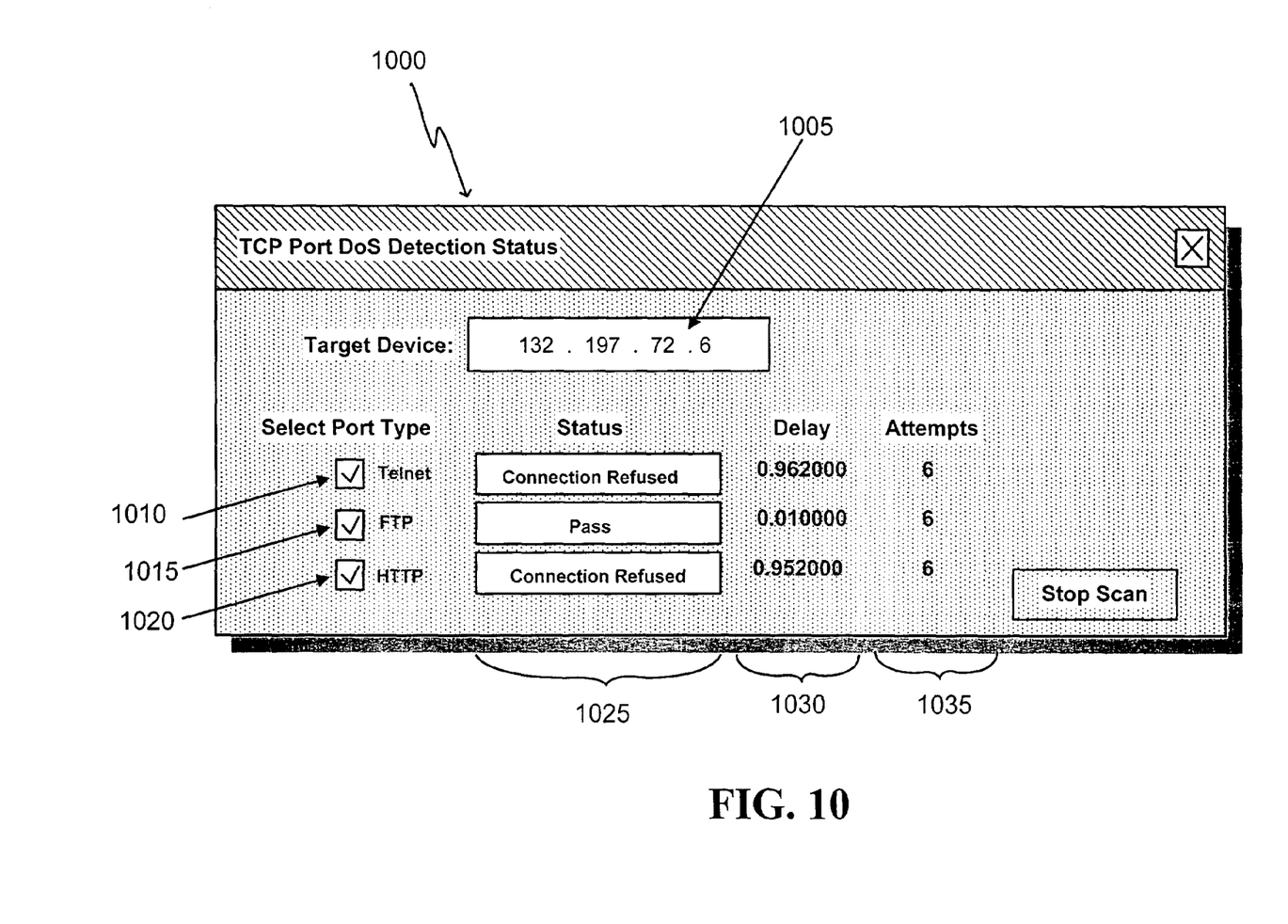
FIG. 10 illustrates an exemplary DoS attack monitoring window of a graphical user interface consistent with the present invention.

FIG. 9 is a flowchart that illustrates an exemplary process, consistent with the present invention, for monitoring the success of denial of service attacks executed in FIG. 8 above. As one skilled in the art will appreciate, the method exemplified by FIG. 9 can be implemented as a sequence of instructions and stored in memory 210 of DoS attacker/scanner 130 for execution by processing unit 205. FIG. 10 will be referenced as a "window" 1000 of an exemplary graphical user interface in conjunction with the exemplary process steps of FIG. 9. One skilled in the art will recognize, however, that other mechanisms for controlling and displaying attack scenario detection status data may be used consistent with the present invention.

The exemplary DoS attack monitoring process may begin with a determination of whether one or more DoS attacks have been executed [act 905]. The one or more DoS attacks may be executed according to the exemplary process of FIG. 8. If so, an attacked target device may be selected [act 910]. FIG. 10 illustrates a target device field 1005 into which the network address of a target network device or resource may be entered. This address may be entered manually or automatically to correspond to the destination address that had been entered for the particular attack being executed. A port type of the selected target device may further be selected [act 915]. As illustrated in FIG. 10, the port type may include a Telnet port type 1010, a File Transfer Protocol (FTP) 1015, and a HyperText Transport Protocol (HTTP) 1020. Selection of each of the port types by "checking" an appropriate box may initiate a test probe connection request for the selected port type. The test probe connection requests may then be sent to known TCP ports of the target device of the selected port type [act 920].

A connection status for each port type may be indicated [act 925]. FIG. 10 illustrates connection status fields 1025 for each selected port type. For example, as illustrated in FIG. 10, the status of the Telnet and HTTP port types is shown as "connection refused," whereas the status of the FTP port type is shown as "pass." A delay between transmission of each of the connection requests for each port type may further be indicated [act 930]. FIG. 10 illustrates delay value fields 1030 for each selected port type. For example, the delay values for the Telnet, FTP, and HTTP port types are shown in FIG. 10 as 0.962000, 0.010000 and 0.952000 seconds, respectively. A number of connection request attempts for each port type may also be indicated [act 935]. FIG. 10 illustrates number of attempts fields 1035 for each selected port type. For example, the number of connection request attempts for the Telnet, FTP, and HTTP port types are shown in FIG. 10 as 6 for all three port types. Based on the port status information derived from window 1000 of FIG. 10, defensive countermeasures may be implemented at a target network resource, and selected DoS attacks may be executed upon the network resource and tested consistent with the exemplary process of FIG. 9.

CONCLUSION

Systems and methods consistent with the present invention permit the implementation of customized DoS attacks upon a network resource such that defensive countermeasures to such DoS attacks may be tested. Consistent with the present invention, any one of several Dos attacks, including UDP packet flooding, TCP SYN packet flooding, ICMP echo packet flooding, RIP packet flooding, and/or BGP packet flooding, may be selected for executing DoS attacks upon a target network resource. After execution of the selected attacks, test probe connection requests may be sent to different port types of the target network resource to monitor the success of the selected attacks. Based on whether the connection requests are refused, systems and methods consistent with the invention may indicate the status of the port types of the target network device and the success of the DoS attack upon the network resource. Any defensive countermeasures used may be reevaluated in light of the success of the DoS attack.

The foregoing description of embodiments of the present invention provides illustration and description, but is not intended to be exhaustive or to limit the invention to the precise form disclosed. Modifications and variations are possible in light of the above teachings or may be acquired from practice of the invention.

While series of acts have been described in FIGS. 5-6 and 8-9, the order of the acts may vary in other implementations consistent with the present invention. Also, non-dependent acts may be performed in parallel. No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the following claims and their equivalents.

What is claimed is:

1. A computerized method of monitoring, for a user, a dental of service attack upon a target network resource, the method comprising:
    providing said user with a first option to make a selection, via a computer, between a straight and a random ordering of packets, said random ordering generated by said computer, said packets selected from the group of packets consisting of TCP packets, WIMP packets, UDP packets, RIP packets and BGP packets, said selected packets used to achieve packet flooding of said target network resource in said attack;
    providing said user with a second option for selecting other packet randomization on and performed by said computer, said other packet randomization including a randomization option selected from the group of randomization options consisting of packet source address field randomization option, packet source port number randomization option, packet destination port number randomization option and packet payload size randomization option, and applying said selected randomization option to applicable said selected packets;
    executing said denial of service attack against the target network resource in accordance with the selected ordering of said packets and said selected randomization option;
    monitoring one or more ports of the target network resource to determine, for the user, an effect of the executed denial of service attack; and
    displaying for the user the effect of the executed denial of service attack.

2. The method of claim 1, wherein monitoring one or more ports of the target network resource further comprises:
    sending one or more connection requests to the one or more ports of the target network resource.

3. The method of claim 2, wherein monitoring one or more ports of the target network resource further comprises:
    determining whether each of the one or more connection requests is refused by the network resource.

4. The method of claim 1, wherein a scenario for the denial of service attack comprises: a network address for the target network resource.

5. The method of claim 4, wherein a scenario for the denial of service attack comprises:
    a port number associated with the network address.

6. The method of claim 1, wherein monitoring one or more ports of the target network resource further comprises
    detecting a success of the denial of service attack upon the one or more ports of the target network resource.

7. The method of claim 1, wherein the one or more ports comprise at least one of Telnet, file transfer protocol (FTP) and hypertext transport protocol (HTTP) ports.

8. The method of claim 1, wherein a scenario for the denial of service attack comprises
    a duration for the denial of service attack.

9. The method of claim 1, wherein a scenario for the denial of service attack comprises: a delay time that indicates a delay between transmitting packets of the denial of service attack.

10. The method of claim 1, wherein a scenario for the denial of service attack comprises:
    a payload size of packets of the denial of service attack.

11. A system for monitoring to denial of service attack upon one of a plurality of target network resources, comprising:
    a memory configured to store instructions; and
    a processor configured to respond to a first selection by a user between a straight and a random ordering of packets selected from the group of packets consisting of TCP packets, ICMP packets, UDP packets, RIP packets and BGP packets, said selected packets used to achieve packet flooding of said target network resource in said attack;
    said processor further configured to respond to a second selection by said user of a randomization option on said processor, said randomization option selected from the group of randomization options consisting of packet source address field randomization option, packet source port number randomization option, packet destination port number randomization option and packet payload size randomization option, and after said first selection and said second selection execute the instructions in the memory to:
        execute said denial of service attack against the one target network resource in accordance with the first selection and the second selection; and
        scan one or more ports of the one target network resource to determine an effect of the executed denial of service attack.

12. The system of claim 11, the processor further configured to execute the instructions in the memory to:
    send one or more connection requests to the one or more ports of the target network resource.

13. The system of claim 12, the processor further configured to execute the instructions in the memory to:
    determine whether each of the one or more connection requests is refused by the network resource.

14. The system of claim 11, wherein an attack scenario comprises:
    a network address for the target network resource.

15. The system of claim 4, therein an attack scenario comprises: a port number associated with the network address.

16. The system of claim 11, the processor further configured to execute the instructions in the memory to:
    detect a success of the denial of service attack upon the one or more ports of the target network resource.

17. The system of claim 11, wherein the one or more ports comprise at least one of Telnet, file transfer protocol (FTP) and hypertext transport protocol (HTTP) ports.

18. The system of claim 11, wherein an attack scenario comprises:
    a duration for the denial of service attack.

19. The system of claim 11, wherein an attack scenario comprises:
    a delay time that indicates a delay between transmitting packets of the denial of service attack.

20. The system of claim 11, wherein an attack scenario comprises:
    a payload size of packets of the denial of service attack.

21. A non-transitory computer-readable medium containing instructions stored in memory and executable by at least one computer processor for controlling the at least one processor to perform a method of monitoring, for a user of said computer, a denial of service attack upon a target network resource of a plurality of network resources, the method comprising:
    said user choosing between a straight and a random ordering of packets selected from the group of packets consisting of TCP packets, ICMP packets, UDP packets, RIP packets and BGP packets, said selected packets used to achieve packet flooding of said target network resource in said attack;
    said user selecting a randomization option on said computer, said randomization option selected from the group of randomization options consisting of packet source address field randomization option, packet source port number randomization option, packet destination port number randomization option and packet payload size randomization option, and applying said selected randomization option to applicable said selected packets;
    executing, said denial of service attack against the target network resource in accordance with the chosen ordering of said packets and said selected randomization option;
    determining an effect of the executed denial of service attack upon one or more ports of the target network resource; and
    displaying the determined effect of the executed denial of service attack.

22. The computer-readable medium of claim 21, wherein determining an effect of the executed denial of service attack comprises:
    sending one or more connection requests to the one or more ports of the target network resource.

23. The computer-readable medium of claim 22, wherein determining an effect of the executed denial of service attack comprises:
    determining whether each of the one or more connection requests is refused by the network resource.

24. The computer-readable medium of claim 21, wherein an attack scenario comprises:
    a network address for the target network resource.

25. The computer-readable medium of claim 24, wherein an attack scenario comprises:
    a port number associated with the network address.

26. The computer-readable medium of claim 21, wherein determining an effect of the executed denial of service attack comprises:
    detecting a success of the denial of service attack upon the one or more ports of the target network resource.

27. The computer-readable medium of claim 21, wherein the one or more ports comprise at least one of Telnet, the transfer protocol (FTP) and hypertext transport protocol (HTTP) ports.

28. The computer-readable medium of claim 21, wherein an attack scenario comprises:
    a duration for the denial of service attack.

29. The computer-readable medium of claim 21, wherein an attack scenario comprises:
    a delay time that indicates a delay between transmitting packets of the denial of service attack.

30. The computer-readable medium of claim 21, wherein an attack scenario comprises:
    a payload size of packets of the denial of service attack.

* * * * *